(12) United States Patent
Rosenau et al.

(10) Patent No.: US 6,512,376 B2
(45) Date of Patent: Jan. 28, 2003

(54) METHOD FOR DETERMINING A REQUIREMENT TO REPLACE A COMPONENT PART AND ARRANGEMENT FOR THE IMPLEMENTATION OF THE METHOD

(75) Inventors: Dirk Rosenau, Berlin (DE); Torsten Schlaaff, Zepernick (DE)

(73) Assignee: Francotyp-Postalia AG & Co. KG, Birkenwerder (DE)

( * ) Notice: Subject to any disclaimer, the term of this patent is extended or adjusted under 35 U.S.C. 154(b) by 0 days.

(21) Appl. No.: 10/004,898

(22) Filed: Dec. 3, 2001

(65) Prior Publication Data

US 2002/0097054 A1 Jul. 25, 2002

(30) Foreign Application Priority Data

Dec. 11, 2000 (DE) .......................... 100 61 665

(51) Int. Cl.⁷ ............................................ G10N 27/416
(52) U.S. Cl. ...................................................... 324/426
(58) Field of Search ................................ 324/426, 427, 324/430, 431, 433, 434, 435; 320/132, 149, DIG. 21; 340/635, 636; 429/61, 90

(56) References Cited

U.S. PATENT DOCUMENTS

| 3,962,539 A | 6/1976 | Ehrsam et al. |
| 4,200,770 A | 4/1980 | Hellman et al. |
| 4,405,829 A | 9/1983 | Rivest et al. |
| 4,689,478 A | 8/1987 | Hale et al. |
| 4,804,957 A | 2/1989 | Selph et al. |
| 4,812,965 A | 3/1989 | Taylor |
| 4,995,085 A | 2/1991 | Kern et al. |
| 5,027,397 A | 6/1991 | Double et al. |
| 5,231,668 A | 7/1993 | Kravitz |
| 5,243,654 A | 9/1993 | Hunter |
| 5,821,975 A | 10/1998 | Günther et al. |
| 5,949,467 A | 9/1999 | Günther et al. |
| 5,953,426 A | 9/1999 | Windel et al. |
| 6,041,704 A | 3/2000 | Pauschinger |

FOREIGN PATENT DOCUMENTS

| DE | 37 23 530 | 1/1989 |
| DE | 37 03 387 | 9/1993 |
| DE | 44 09 803 | 9/1994 |
| DE | 42 43 092 | 3/1996 |
| DE | 197 54 675 | 7/1999 |
| DE | OS 199 12 780 | 6/2000 |
| DE | OS 199 58 948 | 9/2000 |
| EP | PS 0 504 843 | 3/1992 |
| EP | OS 0 884 569 | 5/1998 |
| EP | PS 1 035 513 | 2/2000 |
| EP | OS 1 035 516 | 2/2000 |
| EP | OS 1 035 517 | 2/2000 |
| EP | 1 035 518 | 2/2000 |

Primary Examiner—Edward H. Tso
(74) Attorney, Agent, or Firm—Schiff Hardin & Waite

(57) ABSTRACT

In a method and arrangement for determining a requirement to replace a component in a device, the measurement of a first parameter that has an unbeneficial influence on the consumption or the service life of the component is replaced by the measurement of at least two parameters that represent the first parameter and whose changes allow the current condition of the component to be calculated. A count reading is thereby modified such that it approaches an outage threshold that is specific for the component and such that the device emits a warning before the end of use or end of the service life of the component part is reached. The invention can be advantageously utilized for the indirect measurement of parameters of components that are located in a security module or in its immediate proximity, for example for determining a requirement for battery replacement for security modules.

12 Claims, 4 Drawing Sheets

METHOD FOR DETERMINING A REQUIREMENT TO REPLACE A COMPONENT PART AND ARRANGEMENT FOR THE IMPLEMENTATION OF THE METHOD

BACKGROUND OF THE INVENTION

1. Field of the Invention

The present invention is directed to a method for determining a requirement to replace a component of an apparatus and to an apparatus for the implementation of the method. The apparatus can be a postal security module that, in particular, is suited for use in a postage meter machine or mail processing machine or a computer with a mail-processing function and that allows a battery replacement.

2. Description of the Prior Art

Various security measures are known for protection against outages or malfunctions of intelligent electronic systems. European Application 417 447 already discloses the use of special modules in data processing systems, equipped with means to protect against forced entry into their electronics. Such modules are called security modules below.

Mail processing systems are now modularly constructed in order to be able to make use of a large number of existing modules in different product versions. This procedure eliminates the constant redevelopment of functions for utilization in new versions of systems. Modules are designed such that they can execute at least one function that is to be utilized in different versions. A further advantage of modularly constructed systems is the economic and simple replacement of a module when the module is used up or fails. Display of the consumption of a module and providing a warning about the future outage of a module are means that enable such modules to be replaced in time and are currently included in the service design of modern mail processing systems. Various techniques are in use for this service feature. German OS 195 49 376 discloses an arrangement for determining a remaining amount of an inking ribbon for thermal transfer printing processes wherein the approach of the end of the inking ribbon is determined by an optical recognition unit that detects a mark on the inking ribbon, or by a control means that counts the number of fixed-size imprints. The latter solution assumes a linear relationship between the number of imprints and the length of the inking ribbon.

In the case of consumables such as ink from print heads, direct measurements or statistical counting techniques can be utilized in order to undertake a determination of the material that has been consumed. Despite the non-linear relationship between remaining ink quantity and the number of imprints, German OS 199 58 948 discloses a method for determining the number of imprints that can be executed with a remaining ink quantity and discloses an arrangement for the implementation of this method. A pre-condition, however, is that the ink tank cassette is not a pirated product but an original product that is supplied filled with a defined quantity of ink.

An early recognition of an outage is desirable for all components, assemblies or modules that, for example due to their physical structure, have a shorter service life than that of the overall mail processing system. German OS 199 12 780 discloses that the security module be equipped with a replaceable battery. Based on empirical values about the power consumption of the security module and knowledge of the nominal capacity of the battery, the manufacturer of the security module estimates the likely battery service life and the battery thus is changed in time with a safety margin. A premature change, however, adds cost, particularly since the battery is a an expensive long-life lithium battery.

Here, as well, known techniques can be utilized in order to provide warnings in time, for example to report the necessity to change a battery. Usually, a date threshold is defined and the transgression thereof triggers the alarm based on a date counting procedure. It is possible, however, that the corresponding component or module is not yet completely used up or will not soon fail. Often, the defined threshold is dependent on various parameters during operation (for example, temperature, humidity). These parameters can shift the actual threshold substantially. The result can be that the consumption is higher or lower than the specified threshold or that the outage can ensue earlier or later under certain operating conditions. In all of these cases the user or the owner of the system can incur a variety of financial losses that must be prevented. Direct measurements must be individually configured dependent on the component or module and can quickly increase the unit costs if a number of components or modules are to be monitored. Further, the functioning of some components or modules is impaired due to direct measurement techniques. Thus, for example, the act of making a capacity measurement of a battery can considerably shorten the service life if the normal power consumption is lower than that needed for the measurement.

A security module can assume various statuses in its life cycle that can only be displayed when system voltage is present. Otherwise, the battery of the security module would be quickly depleted. The service life of the battery should be appropriate for the life cycle and should be optimally long. When the postage meter machine is turned off, given power interruptions or a system voltage outage, the postal register data, cryptographic keys and other sensitive data must be preserved and the real-time clock must also continue to run. Permanent monitoring functions that must continue to run interruption-free also must not be compromised. As a result, the need for available battery power increases, with the result that the service life of the battery is shortened.

SUMMARY OF THE INVENTION

An object of the invention is to provide an apparatus and a method for determining a requirement to replace a component, wherein the measurement of a parameter is avoided for which measurement thereof would have an unbeneficial influence on the consumption or on the service life of the component. The dependability of preventing an outage, particularly of components with battery-supported data stores, must be enhanced and the service life of the battery must be optimally exploited at the same time. The apparatus and method can be employed, for example, in postage meter machines for which there are special security demands with respect to the postal register data with the monetary accounting data.

The object is achieved in a method and an apparatus in accordance with the invention wherein indirect measurement techniques are used that deliver a warning indication in time before the outage of a module after the implementation of at least two time-offset parameter measurements. Arbitrarily scalable measurements of the most important parameters that influence the consumption or outage of a component or module are undertaken. When not yet determined by the manufacturer, these parameters are empirically determined with test sequences and, for example, are deposited in table form. Dependent on a measured quantity, a predetermined change of the consumption or of the outage of a component or module is then found for each parameter. In addition to the normal statistical acquisition by counting techniques that was is undertaken in known systems, the measured parameter quantity—by its absolute or percentage change—can now have a suitable (positive or negative), additional influence, namely on the counting technique. Given a number of parameters, correspondingly more influences exist. An indirect measurement arises in this way that can be utilized so that a significantly more precise indication of the new warning threshold for the consumption or outage of a component or module is obtained. For example, a count reading can be modified such that it approaches a failure threshold specified for the component and such that the device emits a warning before the end of consumption or end of the service life of the component is reached. An arrangement for the implementation of the method has a timer for outputting a time parameter, at least one sensor for the measured value registration of a parameter, at least one component whose outage is influenced by this parameter, a microprocessor that is connected to the sensor and to the timer, a memory that contains specific values for this parameter, a memory that stores a count reading that determines the outage of the component part and a program memory that is connected to the microprocessor. The microprocessor executes a function stored in the program memory that, dependent on the measured value of the parameter, the time parameter and the count reading, modifies the count reading such that it approaches an outage threshold specific for the component and generates a warning when it reaches the threshold. This indirect measurement outlay and setup can be performed once and simultaneously utilized for a number of different components or modules when the characteristics of the influencing parameters are known and are likewise evaluated. The processor of a security module monitors the battery with respect to service life, monitors the hardware-implemented accounting unit and memory with respect to the accounting function or data, as well as monitoring other assemblies with respect to further functions. The continued availability of the system is the primary factor, as is a suitable reaction when needed.

The invention is explained below with reference to the example of battery monitoring. The requirement to replace the battery is identified by an evaluation of a measurement of the ambient temperature of the battery and a time measurement. A direct current/voltage measurement that burdens the capacity of the battery is thus eliminated. The evaluation of a measurement of the ambient temperature ensues with reference to the self-discharge current of the battery. Due to an uninterrupted real-time measurement, a microprocessor can determine time intervals, whereby a distinction is made between a transport time interval as well as operating and quiescent time intervals of the device. The measurement and the evaluation of the ambient temperature with reference to the self-discharge current of the battery ensues in the operating time interval, i.e. after the transport time interval or after a quiescent time interval of the device. In the evaluation, current/time products are formed for the aforementioned intervals in the operating time interval, whereby empirically determined currents enter into the calculation, which flow in the transport time interval or in the quiescent time interval of the device and diminish the battery capacity.

DESCRIPTION OF THE PREFERRED EMBODIMENTS

Figure 1:
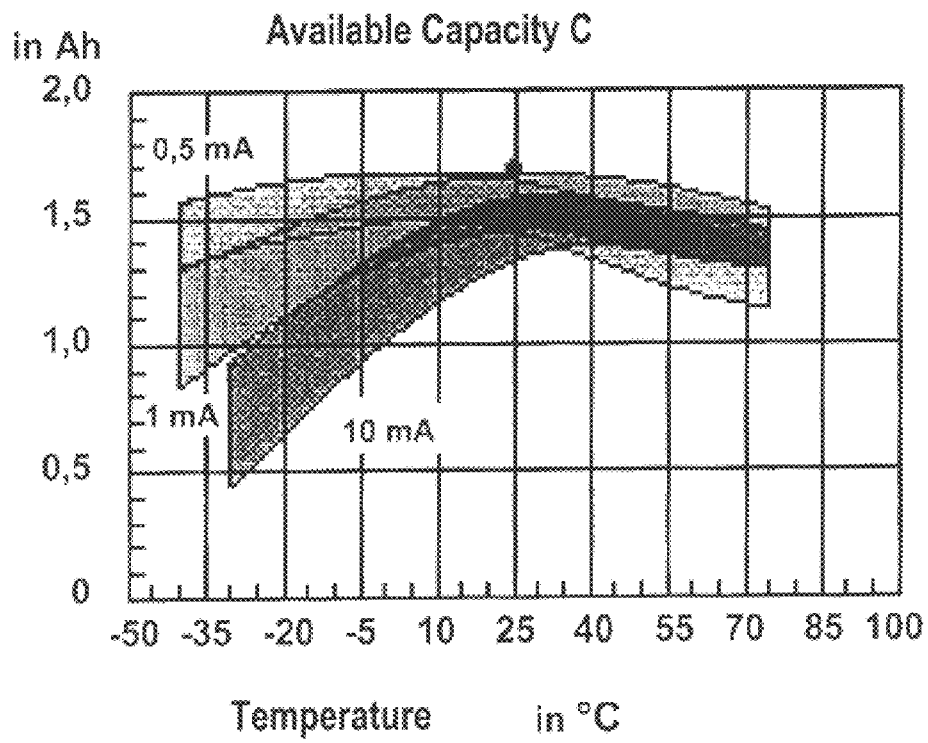
FIG. 1 illustrates the temperature dependency of the battery capacity of a battery monitored by the inventive method and apparatus.

FIG. 1 shows the temperature dependency of the capacity of a lithium battery (Sonnenschein Co.). Its capacity fluctuates by approximately one-fifth (0.3 Ah) in the allowable operating temperature range from +5° C. through +40° C. given a load current of $I_{LB}$=10 mA. The capacity fluctuation is up to an order of magnitude below this given a lower load current of $I_{LB}$=0.5 mA.

In the allowable transport temperature range from −34° C. through +66° C. and given a load current of $I_{LT}$=10 mA, the capacity fluctuates by more than half but more than an order of magnitude less given a lower load current of $I_{LT}$=0.5 mA=500 $\mu$A. During transport of a security module, a maximum load current of $I_{LT}$=50 $\mu$A lies an order of magnitude above the current of the battery self-discharge at 25° C. The load current is caused by components that can have an opposite temperature behavior, at least to a certain extent. Among other things, a real-time clock that constantly continues to run is integrated in the module processor of the security module.

Let the initial capacity at time $t_0$ be $C_{r0}$ and the capacity loss at the end of the transport time at time $t_1$ be $C_{r1}$. The real-time clock is interrogated at time $t_0$ and the date and time of day are stored together with the initial capacity $C_{r0}$. A current/time product $C_{r1}$ that is formed later allows the capacity reduction to be identified under nearly worst case conditions without having to undertake a capacity measurement. Due to a battery self-discharge at +66° C., the tappable capacity drops by 40% to 60% of the initial capacity $C_{10}$ within four years' (=35064 h) storage time. Added thereto is the aforementioned capacity reduction due to the load current of $I_{LT}$=0.05 mA. A remaining capacity $$C_{Rem}=C_{r0}-C_{r1}=C_{r0}-t_1(I_{LT}+I_S) \tag{1}$$

thus remains after the transport with the temperature-dependent battery self-discharge current $I_s$=0.4 $C_{r0}$/35064 h. Since the load current $I_{LT}$ is temperature-dependent—even though to only a slight extent—an empirically determined maximum value should be introduced into Equation (1).

Figure 2:
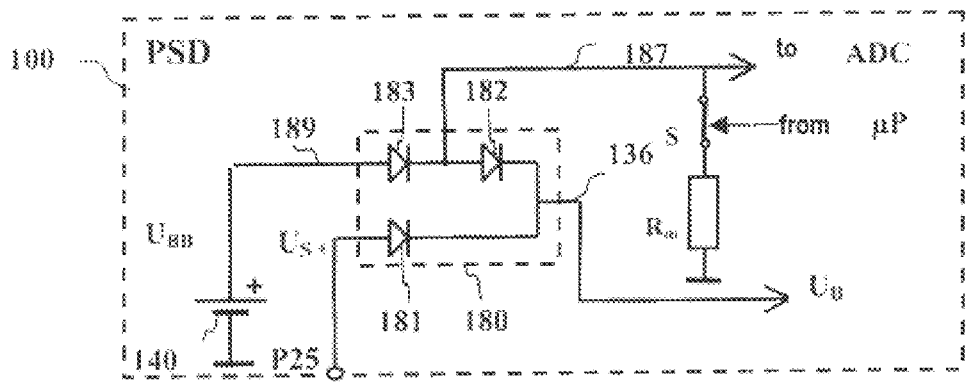
FIG. 2 shows a known measurement circuit.

FIG. 2 shows a known measurement circuit for a second battery 140. A power pack serves as source of a system voltage Us+. The replaceably arranged second battery 140 serves as source for emergency power for the security module 100 when no system voltage Us+ is present. The two sources are decoupled from one another via a voltage switchover 180 and are interconnected such that the higher voltage $U_B$ is present at its output, whereby the following applies:

$$U_B=U_S, \text{ when } U_S>U_{BB} \tag{2}$$

The positive pole of the second battery 140 is connected to one of the two inputs of the voltage switchover 180 via the line 189. A series circuit of Schottky diodes 183, 182 leads to the output of the voltage switchover 180. At the center tap of the series circuit, a precision resistor Rm is at ground via a switch $S_1$ and a line 187 leads via an analog-to-digital converter ADC to a microprocessor (not shown). The latter can open the switch S again when the measurement is over. The second battery 140 has a somewhat higher voltage of $U_{BB}$=3.6 V, and the output of the voltage switchover 180 applies the battery voltage $U_B = U_{BB-UV}$ to components (not shown) of the security module. The dissipated voltage $U_v$ drops at the diodes, or switches if electronically controllable switches are used instead of the diodes.

The typical discharge curves for lithium batteries at, for example, 25° C. exhibit an approximately ideal course in the voltage/time diagram until shortly before the end of the service life, where the discharge curve bends sharply down. Given a direct voltage measurement at the precision resistor, this linearity allows an evaluation as to whether this voltage is in the range before a non-linear region begins, where the discharge curve bends sharply down. A capacity reduction due to a current/time product that is caused by the direct voltage measurement, however, is significantly greater than a capacity reduction due to a current/time product that was empirically determined for the indirect capacity measurement. By taking the power consumption of the components into consideration and by evaluating an ambient temperature measurement with reference to the self-discharge current of the battery, the capacity reduction can be indirectly determined and a need to replace the battery can be determined. On the basis of an uninterrupted real-time measurement, a microprocessor can determine time intervals that contribute to the capacity reduction to different degrees, with a distinction being made between a transport time interval and an operating time interval and between the transport time interval and a quiescent time interval. The operating interval and the quiescent time interval alternate. In accordance with the invention the current/time products are calculated in the operating time intervals, particularly for the temperature-dependent battery discharge current that flows during the operating intervals of the device as well as for the temperature-dependent battery discharge current and a load current $I_{LT}$ that flows in the quiescent time intervals.

Figure 3:
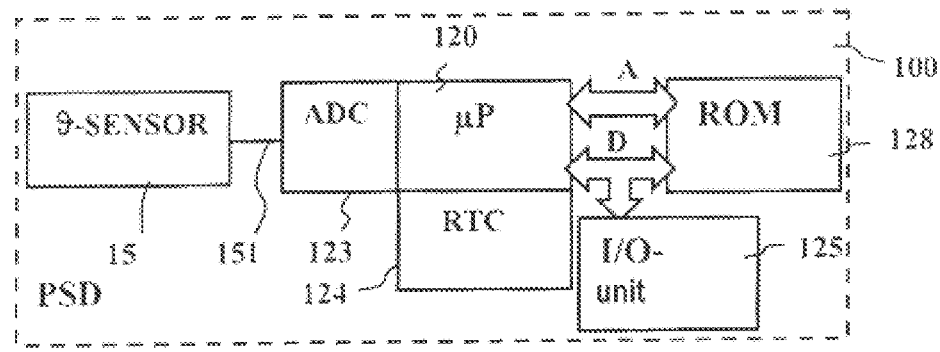
FIG. 3 shows a measurement circuit for indirect determination of a value in accordance with the invention.

FIG. 3 shows a measurement circuit for indirect determination of a value. A sensor 15, preferably a temperature sensor, is connected via a line 151 and an analog-to-digital converter ADC 123 to a microprocessor 120. The latter can be the module processor of the security module PSD 100 that internally contains an ADC and a real-time clock 124. The microprocessor 120 is connected to a flash ROM 128 via address and data lines and to an input/output unit I/O 125.

A first battery 134 (not shown) together with the security module is directly located in a security region of the device, for example a postage meter machine, that is inaccessible to the user. Differing from the replaceable battery according to German OS 199 12 780, the first battery can be permanently soldered on the security module and it can be relatively small and inexpensive. The storage time given exclusive supply by this battery can lie on the order of a few years; however, the warehousing time of this battery must be ≧12 years. Due to its self-discharge, the useful life of the battery can theoretically reach a maximum of 0.1 megahours and practically reach 0.015 megahours since the real-time clock (RTC) 124 must be constantly supplied. The latter corresponds to at least 12 years. This battery is a 3 V lithium battery and can already be connected to the security module/component requiring battery voltage during the ongoing production process in order to enable the storing of information (initialization).

In a mail processing system, there is at least one sensor as well a parameter stored in suitable form or an identifiable characteristic of the battery that is utilized. For example, this sensor can be a temperature sensor. The mail processing system contains at least one component or module that is at risk of being used up or failing. This component can be a battery or any other component or module. The temperature has considerable influence on the capacity of the battery and can greatly alter the use thereof or cause the failure of entire modules that are supplied by the battery. In a mail processing system, security modules that secure postal registers or even inter-machine secrets are supplied with voltage by batteries. Since the service life of a mail processing system usually exceeds that of the battery, a suitable warning indication for a pending replacement or a re-energizing is required. A precise determination of the capacity by means of a direct measurement is expensive and also reduces the capacity. On the other hand, a premature change is often costly. For example, a microprocessor can determine the capacity by means of a count reading, the temperature registered by the sensor and the characteristic corresponding to this battery. This capacity should not reach a prescribed threshold without having the system emit a warning. It is of no significance whether the characteristic is stored in table form or calculated in some other way. The capacity calculated by the microprocessor is more precise the more frequently this determination is undertaken and the more parameters there are that enter into the determination. The measured results from the temperature sensor can be simultaneously used for other components or modules (ink or thermal print head).

During operation from time $t_1$, the security module is supplied with a system voltage. The transport time interval $t_1-t_0$ thus ends. First, the room temperature $\theta_1$ is measured at time $t_1$ in order to decide whether the temperature lies in the allowable temperature range for the operation of the module. For the indirect capacity measurement according to Equation (1), the empirically determined current/time product $C_{r1}$ is then formed for the quiescent time and/or for the transport time and is evaluated in view of the reduction of the battery capacity.

Although the ambient temperature usually will lie within the allowable operating temperature range from +5° C. through +40° C., the security module can heat up to approximately 60° C. during operation. At time $t_1$, for example at the start of a work day, the security module still has the room temperature $\theta_1$. At time $t_2$ or, respectively, $t_3$, let the temperature be $\theta_2$ or, respectively, $\theta_3$ and let the capacity loss be $C_{r2}$ for the time interval $t_2-t_1$ and $C_{r3}$ for the time interval $t_3-t_2$. The real-time clock is queried at time $t_1$, $t_2$ and $t_3$. The date, the time of day and the temperatures $\theta_1$, $\theta_2$ or, respectively, $\theta_3$ are stored.

Due to the battery self-discharge current $I_{S\theta 1}$ given $\theta_1$=+20° C., the tappable capacity drops by 10% to 90% of the initial capacity $C_{r0}$ within 10 years (=87648 h) warehousing time. Due to the battery self-discharge current $I_{S\theta 2}$ given $\theta_2$=+44° C., the tappable capacity drops by 25% to 75% of the initial capacity $C_{r0}$ within 7 years (=61344 h) warehousing time. Due to the battery self-discharge current $I_{S\theta 3}$ given $\theta_3$=+60° C., the tappable capacity drops by 35% to 65% of the initial capacity $C_{r0}$ within 5 years (=43824 h) warehousing time. The temperature of the security module increases inversely to the exponential curve. For example, the temperature of the security module has increased approximately linearly to $\theta_2$=+44° C. in the time interval $t_2-t_1$ and approximately linearly to $\theta_3$=+60° C. in the time interval $t_3-t_2$, whereby the latter time interval is more than twice as long as the former. When the system voltage is present, the load current, i.e. for example for the real-time clock, is supplied by the mains (the public power system into which the apparatus is plugged) and causes no capacity reduction. Only the battery self-discharge current thus flows and a remaining capacity $$C_{Rem} = C_{t0} - \{C_{t1} + C_{t2} + C_{t3}\} \quad (3)$$

remains, with $$C_{t2} = (t_2 - t_1)(\tfrac{1}{2})[I_{S\,\theta1} + I_{S\,\theta2}] \text{ for example: } = (t_2 - t_1)(\tfrac{1}{2})[(0.1 C_{t0}/87648\ h) + (0.25 C_{t0}/61344\ h)] \quad (4)$$

and $$C_{t3} = (t_3 - t_2)(\tfrac{1}{2})[I_{S\,\theta2} + I_{S\,\theta3}] \text{ for example: } = (t_3 - t_2)(\tfrac{1}{2})[(0.25 C_{t0}/61344\ h) + (0.35 C_{t0}/43824\ h)]. \quad (5)$$

A better approach to the real temperature curve is achieved due to an increase in the number of measurements until the machine is turned off. Both a periodic measurement as well as a triggering of the temperature measurement procedure determined by an event are possible, including a measurement when the machine is turned off.

During the quiescent time, or before the operation of the security module, just as during transport, a maximum load current $I_{LT} = 0.05$ mA flows. The ambient temperature will usually lie within the allowable operating temperature range from +5° through +40° in a building or in a climate-controlled room. Without system voltage, however, a temperature measurement cannot be undertaken, so that a temperature estimate is required. However, it can be assumed that the battery of the security module assumes the ambient temperature—which dare not exceed +44° C.—relatively quickly after it is turned off. It should also be assumed that the ambient temperature fools down farther at night and does not exceed +20 C. in the morning. Due to a battery self-discharge at +44° C. (worst case), the tappable capacity drops by 25% to 75% of the initial capacity $C_{t0}$ within seven years (=61344 h) warehouse time. This corresponds to a self-discharge current of approximately 4 μA. Approximately, the temperature of the security module in the quiescent time interval $t_4 - t_3$ has decreased linearly from +44° C. to $\theta_4 = +20°$ C. At +20° C., for example, the self-discharge current only amounts to approximately 1 μA. Given an even lower temperature, the capacity in fact continues to decrease due battery self-discharge, but to a lesser extent. Therefore it can be approximately assumed that the battery self-discharge current at time $t_4$ amounts to approximately 1 μA. Added thereto is the aforementioned reduction in capacity due to the load current of $I_{LT} = 0.05$ mA. A remaining capacity of $$C_{Rem} = C_{t0} - \{C_{t1} + C_{t2} + C_{t3} + C_{t4}\} \quad (6)$$

thus remains after the quiescent time, with $$C_{t4} = (t_4 - t_3)(\tfrac{1}{2})[I_{S\,\theta2} + I_{S\,\theta4}] \text{ for example: } = (t_4 - t_3)(\tfrac{1}{2})[2 I_{LT} + (0.25 C_{t0}/61344\ h) + 1\ \mu A] \quad (7)$$

The remaining capacity can thus be calculated according to Equation (8):

$$C_{Rem} = C_{t0} - \{C_{t1} + C_{t2} + C_{t3} + C_{t4} + \ldots + C_{tn} + \ldots + C_{tz}\} \quad (8)$$

Consequently, it can be calculated for each event. The transport event can be repeated, whereby the more stringent conditions are again introduced into the calculation. The security module is preferably utilized in meters or postage meter machines. Since the data center and postal authority must be informed of every change in location, an input into the meter or into the postage meter machine being required for this purpose, this information also can be accessed by the security module. Finally, a limit value $C_L = F \cdot C_{t0}$ must be determined from a data sheet or empirically for each battery, the microprocessor being able to check with reference thereto whether the remaining capacity is still adequate. According to Equation (9), the battery must be replaced when $$C_L \geq C_{Rem} \quad (9)$$

applies. The following Equation (10) derives in combination with Equation (8):

$$C_{t0}(1-F) - C_{t1} \leq C_{t2} + C_{t3} + \ldots + C_{tn} + \ldots C_{tz} \quad (10)$$

$$x * C_{t0} - C_{t1} \leq \sum_{n=2}^{z} C_{tn} \quad (11)$$

applies for n measurements with $2 \leq n \leq z$.

For evaluating the measurement of the ambient temperature of the battery and the real-time measurement, thus, the difference is determined between an identified current/time product $C_{t1}$ for a transport time interval and a remaining capacity $x \cdot C_{t0}$ that corresponds to a predetermined part of x% of the original battery capacity $C_{t0}$. The battery need only be changed when this difference is no longer smaller than the sum of all current/time products $\Sigma C_{tn}$, that are determined during the operating intervals for the operating and quiescent time intervals of the device.

When, for example, a safety factor F=0.1 is utilized, then $x \cdot C_{t0} = 0.9 \cdot C_{t0}$ applies. When, however, it is assumed proceeding from Equation (1) that the transport interval <½ year, i.e. does not exceed 4071 h=169 days, so that a current/time product $C_{t1} = 4071$ H (61.4 μA)=249990.79 μAh=¼ $C_{t0}$ derives when $C_{t0}$=1Ah, then Equation (8) can be simplified. On the basis of inequality (12), the microprocessor can check roughly whether the remaining capacity that remains is no longer adequate and the battery must be replaced:

$$\tfrac{3}{4} C_{t0} < C_{t2} + C_{t3} + C_{t4} + \ldots + C_{tn} + \ldots + C_{tz} \quad (12).$$

The limit value $C_L$ for a warning and request to replace the battery preferably lies in the range $0.75 \cdot C_{t0} \leq C_L \leq 0.9 \cdot C_{t0}$.

Figure 4:
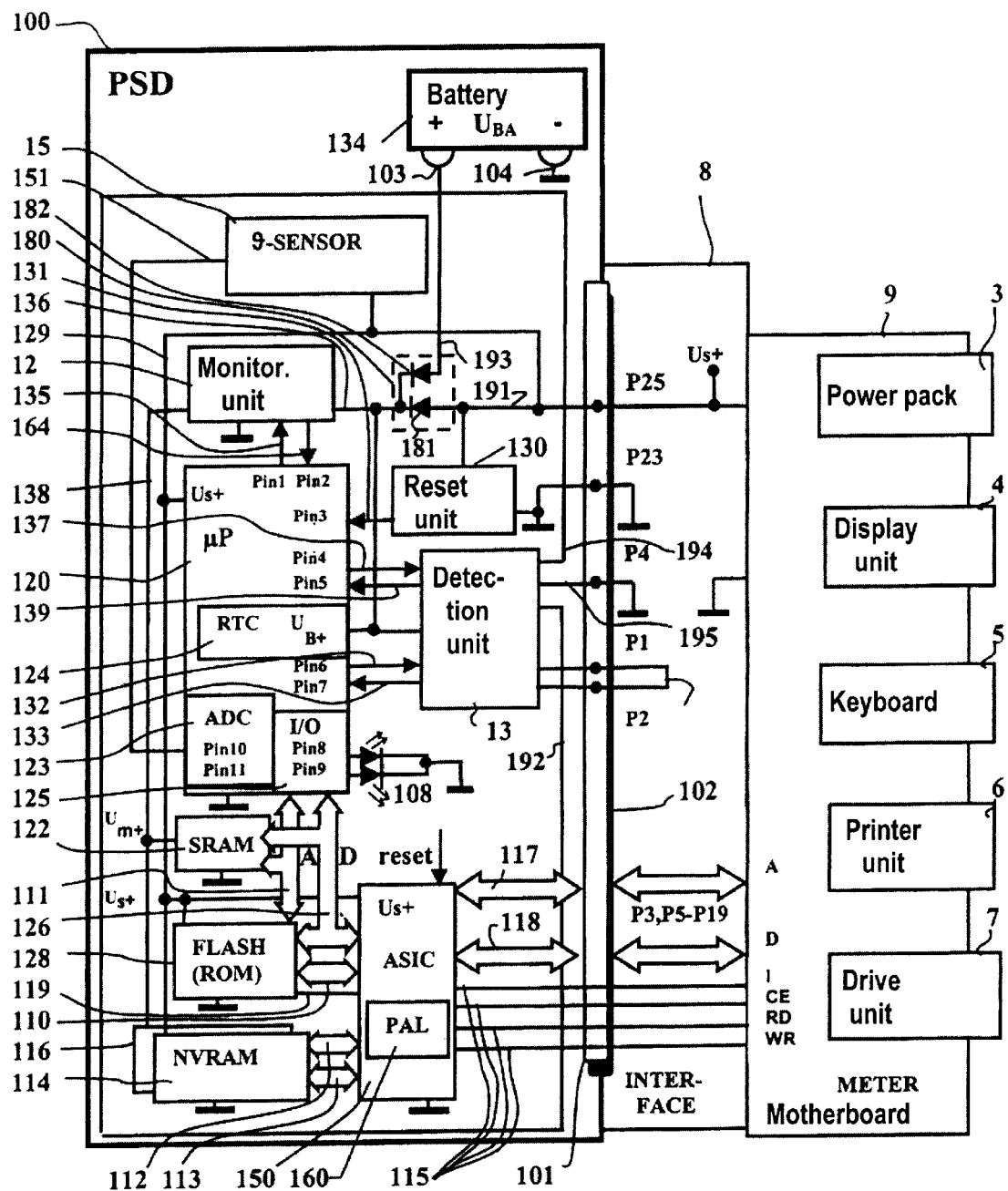
FIG. 4 is a block circuit diagram of the security module in a postage meter machine.

FIG. 4 shows a block circuit diagram of the postal security module (PSD) 100 that is interconnected with a postage meter machine in a preferred version. A power pack 3 (connected to the mains), a display unit 4, a keyboard 5, a printer unit 6 and a drive unit 7 are connected to the meter motherboard 9 of the meter 2 or a postage meter machine 1. The power pack 3, the display unit 4, the keyboard 5 and the drive unit 7 can be arranged outside a security region. The postal security module 100 has a communication connection with the meter motherboard 9 of the meter 2 or of the postage meter machine via a system bus 11, 117, 118 via a contact group 101, 102 and via an interface 8 and is either supplied with a system voltage by the power pack 3 or with battery voltage by the first battery 134. The module processor can enter into a communication connection with a remote data center (not shown) via the system bus and, for example, a modem (not shown). In order to load a credit and store the postal accounting data in non-volatile memories of different technologies, a first and second non-volatile memories are provided in the postal security module 100. The accounting is accomplished by an application-specific circuit integrated (ASIC) 150 of the postal security module 100. The ASIC 150 contains at least one hardware accounting unit for the calculation of the postal data to be stored. The ASIC 150 is controlled by a programmable array logic (PAL) 160. An access logic for the ASIC 150 is accommodated in the PAL 160. An address and control bus 117, 115 from the motherboard of the meter 1 is connected to corresponding pins of the logic PAL 160, and the logic PAL 160 generates at least one control signal for the ASIC 150 and a control signal 119 for the program memory FLASH 128. The module processor 120 processes a program that is stored in the FLASH 128. The module processor 120 and the other assemblies such as FLASH 128, ASIC 150 and PAL 160 are connected to one another via an internal module system bus that contains lines 110, 111, 126, 119 for data, address and control signals.

A KS32C41000 RISK Microprocessor of the Samsung company is especially suited as module processor 120. This internally has a processing unit CPU 121, a real-time clock 122, an AND converter ADC 123 and an input/output unit 125. The module processor 120 of the security module 100 is connected via an internal module data bus 126 to a FLASH 128 and to the ASIC 150. The FLASH 128 serves as program memory and is supplied with system voltage Us+. For example, it is a 128 Kbyte FLASH memory of the type AM29F010-45 EC. Via an internal address bus 111, the module processor 120 of the security module 100 supplies the addresses 0 through 15 to the corresponding address inputs of the FLASH 128 and of a static main memory SRAM 122. Via the contact group 101, 102 of the interface, the ASIC 150 of the security module 100 has a communication connection with the data bus 118, with the address bus 117 and the control bus 115 of the motherboard of the meter 2.

Via the line 131, the reset unit 130 is connected to the pin 3 of the module processor 120 and to a pin of the ASIC 150. Given lowering of the system voltage, the module processor 120 and the ASIC 150 are reset by generating a reset in the reset unit 130. During idle times outside normal operation, the first battery 134 supplies the real-time clock 122 with the data and time of day registers and supplies the static main memory SRAM 124 that contains security-relevant data.

The negative pole 104 of the first battery 134 at y is applied to ground and connected to a pin P23 of the contact group 101. The positive pole 103 of the first battery 134 is connected via the line 193 to the one input of the voltage switchover 180, and the pin P25 of the contact group 101 that carries the system voltage is connected via a line 191 to the other input of the voltage switchover 180. When the system voltage is designed for a higher nominal voltage than the first battery 134, then Schottky diode suffice for decoupling; otherwise, controlled switches must be utilized in the voltage switchover 180. The circuit type DS 1314 of Dallas Semiconductor or a commercially available circuit type ADM 8693ARN is suited as the voltage switchover 180. The first battery 134 is, for example, a lithium battery type CR ½ AA CD of the Varta company. Its nominal capacity $C_{t0}$ is specified as 950 mAh. The service life given optimum operating and warehousing conditions is only limited by the storage time and warehouse time of this battery. Of course, any other higher-capacity 3 V lithium battery is also suitable as first battery 134 such as, for example, type SL-389/P according to DE199 12 760 A1.

Via the line 136, the output of the voltage switchover 180 is adjacent at a voltage monitoring unit 12, at a detection unit 13 and at a real-time clock 124 of the microprocessor. The voltage monitoring unit 12 and the detection unit 13 have a communication connection with the pins 1, 2 and the pins 4, 5 of the microprocessor 120 via the lines 135, 164 and 137, 139. The P25 of the contact group 101 that carries the system voltage is connected via a line 129 to the supply input of a first memory 114. For example, the latter is a static main memory that becomes the non-volatile memory NVRAM 114 of a first technology due to the existing system voltage.

A voltage $U_m+$ that is supplied on the line 138 from the output of the monitoring unit 12 lies at the supply input of a static main memory SRAM 122 serving as main memory and at the supply input of a second non-volatile memory NVRAM 116. When the system voltage is switched off, one of the two battery voltages is present. When the voltage of the battery drops below a specific limit during battery operation, the circuit of the monitoring unit 12 connects the feed point for the SRAM to ground, i.e., the voltage at the SRAM then lies at 0 V. This leads causes the SRAM 122 that, for example, contains important cryptographic keys to be very quickly erased. When the supply voltage of the second non-volatile memory NVRAM 116 also drops to zero at the same time, however, no data are lost. The second non-volatile memory NVRAM is based on a second technology (shadow RAM). This second technology preferably is a RAM and an EEPROM, whereby the latter automatically accepts the data contents given a system voltage outage. The NVRAM 116 of the second technology is connected to the corresponding address and data inputs of the ASIC 150 via an internal address and data bus 112, 113.

The circuit of the voltage monitoring unit 12 is dimensioned such, for example, that any and all drop of the battery voltage on the line 136 below the specified threshold of 2.6 V leads to the response of the circuit 12. The circuit 12 switches into a self-holding condition simultaneously with the indication of the under-voltage of the battery, remaining therein even given subsequent boosting of the voltage. It also supplies a status signal 164. The next time the module is switched on, the module processor 120 can interrogate the status of the circuit (status signal) and/or can evaluate the erased status of the memory, to conclude that the battery voltage has dropped below a specific value in the meantime. The module processor 120 can reset the monitoring circuit 12, i.e. "arm" it. The latter reacts to a control signal on the line 135.

The line 136 at the input of the voltage monitoring unit 12 simultaneously supplies a detection unit 13 with operating or battery voltage. The detection unit 13 is connected to a conductor loop 192, 194 that is worked into the housing of the security module and is cast out with casting compound (for example, synthetic resin). An attack on the housing (for example, drilling) can thus be detected.

The processor 120 interrogates the status of the detection unit 13 via the line 139, or the detection unit 13 is triggered or set by the module processor 120 via the line 137. A static test for connection is implemented after the setting. To that end, ground potential that is adjacent at the terminal P4 of the interface 8 of the postal security module 100 and that can only be interrogated when the security module 100 is properly plugged is interrogated via a line 195. When the security module 100 is plugged, ground potential of the negative pole 104 of the battery 134 of the postal security module 100 is applied to the terminal P23 of the interface 8 and, thus, can be interrogated by the detection unit 13 at the terminal P4 of the interface via the line 192.

Lines 13 that form a conductor loop 17 only when a security module 100 is plugged, for example to the motherboard of the meter 1, are connected to the pins 6 and 7 of the module processor 120 via the detection unit 13. For dynamically testing whether or not the postal security module 100 is plugged to the motherboard of the module 1, the module processor 120 applies changing signal levels to the pins 6, 7 at extremely irregular time intervals and these are fed back via the loop.

The module processor 120 is equipped with the input/output unit 125 whose terminal pins 8, 9 serve for the output of at least one signal for signaling the status of the security module 100. I/O ports of the input/output unit 125 lie at the pins 8 and 9, infernal signal means of the module being connected thereto, for example colored light-emitting diodes LEDs 107, 108. These signal the module status through an opening 109 in the meter housing when a security module 100 is plugged onto the motherboard of the meter 1. The security modules can assume various statuses in their life cycle. Thus, for example, the battery condition must be detected and also whether the security module contains valid cryptographic keys. It is also important to distinguish whether the security module is functioning or broken. The exact type and number of module statuses is dependent on the functions realized in the security module and on the implementation. For evaluating the temperature, a sensor 15 is connected to the microprocessor via the analog-to-digital converter 123. The P25 of the contact group 101 that carries the system voltage delivers the supply voltage for the sensor 15. The analog-to-digital converter 123 supplies the microprocessor with a digitized measured value for the evaluation of the existing temperature. The microprocessor is connected via an input/output unit 125 either directly to a signaling elements 107, 108 for the statuses of the security module, or indirectly to a signaling element of the meter (beeper), or to the display unit 4 thereof.

Figure 6:
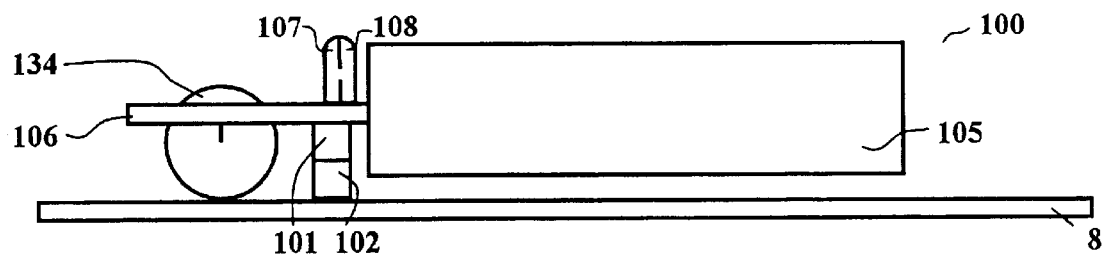
FIG. 6 is a side view of the security module.

FIG. 6 shows the mechanical structure of the security module in plan view. The security module is fashioned as multi-chip module, i.e. a plurality of function units are interconnected in a first part of a printed circuit board 106. The casting compound surrounds the first part of the printed circuit board 106 in cuboid fashion, whereas a second part of the printed circuit board 106 for the first battery 134 remains free of casting compound. The printed circuit board 106 has an opening 109 for the first battery 134 and solder points or battery contact posts 103 and 104 for the connection of the poles of the battery 134, preferably under the printed circuit board 106. The contact group 101 (shown with broken lines) is arranged under the printed circuit board 106 (interconnect side) of the security module 100 for plugging the postal security module PSD 100 onto the motherboard of the meter 2.

Figure 5:
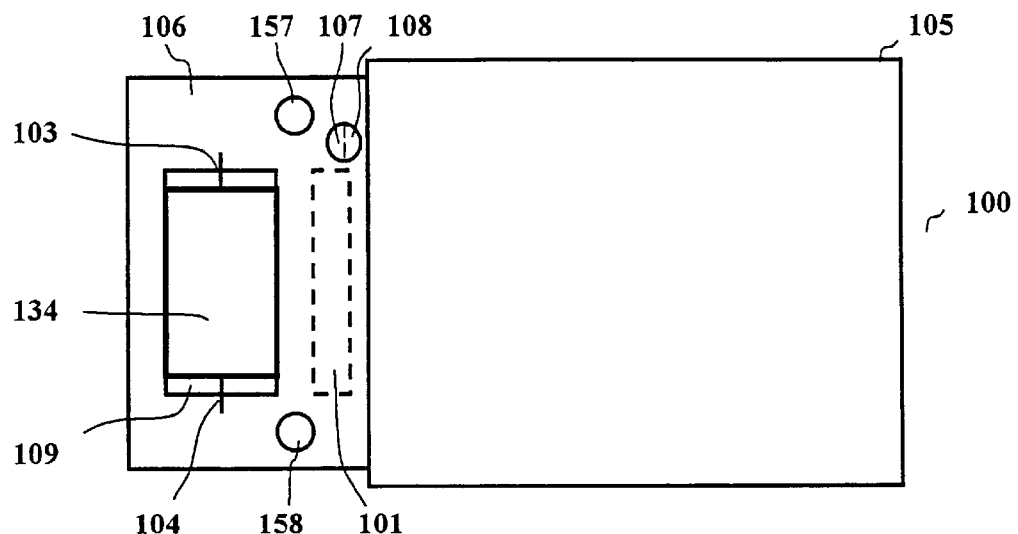
FIG. 5 is a plan view of the security module.

FIG. 5 shows a side view of the postal security module. When the security module is plugged onto the motherboard via interface 8, then it can be arranged such within the meter housing that the signal elements 107, 108 is close to an opening 20 (FIG. 3) or projects into it. The meter housing is designed such that user can nonetheless see the status display of the security module from the outside (FIG. 3). Two light-emitting diodes as the signal elements 107, 108 are accommodated in a common component housing (bicolor light-emitting diode), for which reason the dimensions or the diameter of the opening can be relatively small, on the order of magnitude of the signal elements. Three different colors can be fundamentally displayed (red, green, orange) dependent on whether the light-emitting diodes are driven individually or simultaneously. For distinguishing between statuses, the light-emitting diodes also can be driven so as to flash individually or together, or flashing in alternation, so that nine different statuses can be distinguished wherein at least one of the two light-emitting diodes is activated. Alternatively, the two light-emitting diodes forming the signal elements 107 and 108 can be arranged at a location such that they can only be observed by a service technician, or the two output signals of the I/O ports at the pin 8, 9 of the module processor 120 are communicated to the display unit 5 via the processor of the motherboard. The module processor undertakes a monitoring and signaling of the module status and is only activated in the operating time interval, i.e. when the security module is supplied with system voltage, which acts to preserve the battery. The module processor monitors the hardware-implemented accounting unit, the memories and the first battery 134 as well as further assemblies in the security region. Dependable recognition of malfunctions or outages or depletion as well as a suitable reaction are thereby achieved.

Figure 7:
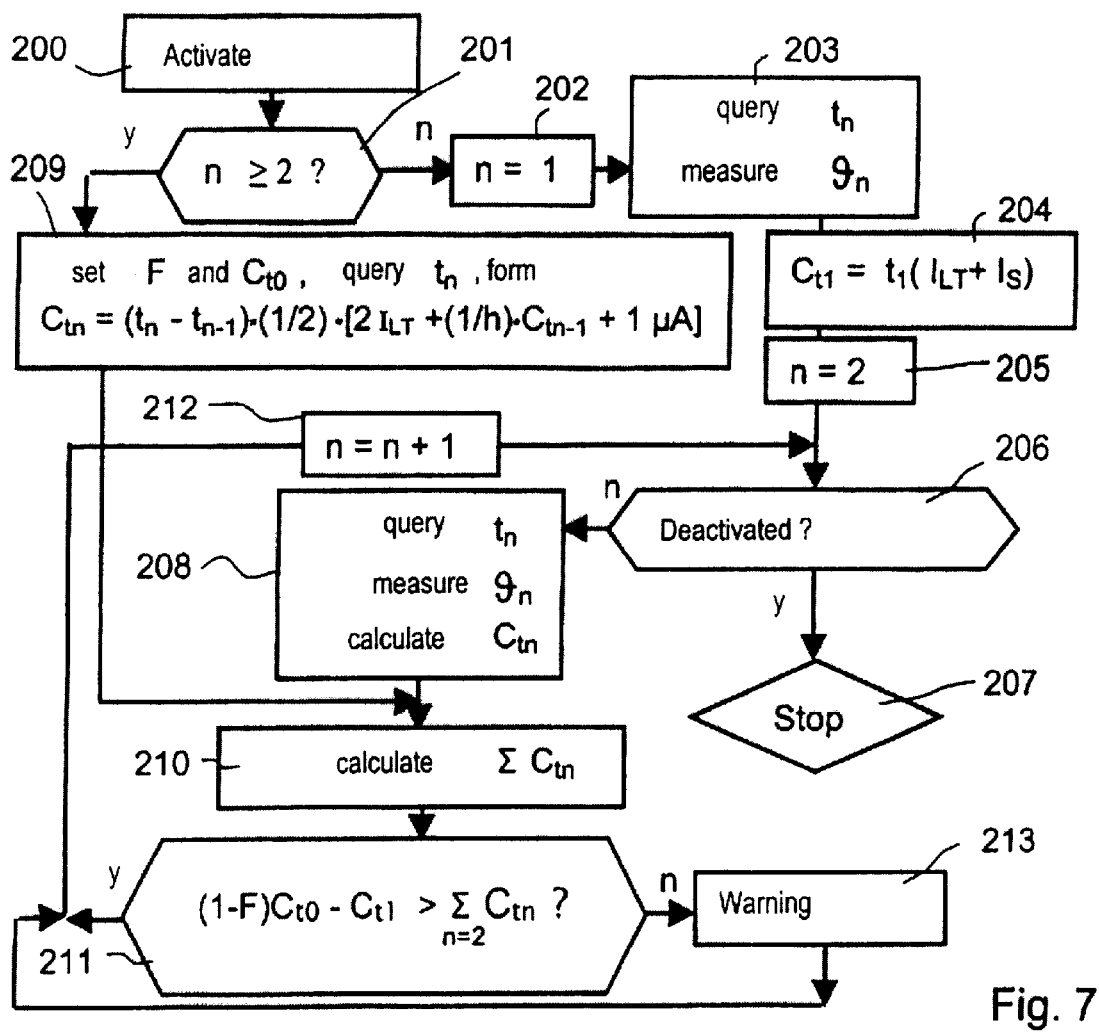
FIG. 7 is a s flowchart of the inventive method.

FIG. 7 shows a flowchart for the inventive method. The module processor 120 implements a number of steps in determining the requirement for battery replacement.

After the device is turned on (step 200), a query step 201 is reached and the count reading n of a loop counter is interpreted. At the start, the loop counter stands at n–0 and a further branch is thus made to the step 202 wherein the loop counter is set to n=1.

A step 203 is then reached in order to query the count reading of the real-time counter at time $t_1$. At time $t_1$, moreover, the room temperature $\theta_1$ is measured. In a sub-step (not shown), a decision can be made on the basis of the latter as to whether the temperature lies within the allowed temperature range for the operation of the module. In step 204, the current/time product $C_{t1}$ for the transport time is formed for the indirect capacity measurement according to Equation (1), whereby the empirically determined currents composed of load current and battery self-discharge current are billed [sic!!!]. Via a step 205 wherein the loop counter is set to n=2, a further branch is then made to a step 206 wherein a query is made to see whether the device should be switched off in the meantime. Operation is stopped (step 207) when the latter is the case. Otherwise, a branch is made to a step 208 in order to query the count reading of the real-time counter at time tn and to employ the room temperature $\theta_n$ measured at time $t_n$ for the calculation of the appertaining current/time product $C_{tn}$ according to Equation (4). In the following step 210, the current/time products are added, as can be seen from Equations (3) or, respectively, (10). A count reading is thereby modified such that this approaches an outage threshold specified for the battery at which the device outputs a warning before the end of use or, respectively, end of the service life of the battery is reached. Whether the Inequality (11) is satisfied is queried in the query step 211. The difference is formed between an identified current/time product $C_{t1}$ for a transport time interval and a remaining capacity $x \cdot C_{t0}$ that corresponds to a predetermined portion x of the original battery capacity $C_{t0}$, whereby the battery must be replaced when said difference is no longer smaller than the sum of all current/time products $\Sigma C_{tn}$ that are determined during the operating time intervals for the operating and quiescent time intervals of the device. When the Inequality (11) is satisfied, a branch is made via the step 213 onto the step 212, whereby a warning is generated and displayed in step 213. When the Inequality

(11) is not satisfied, a direct branch is made back to step 212. The loop counter is incremented to n=n+1 in the step 212. A branch his then made back to the step 206 wherein a query is again made about deactivation. At the next activation, for example the next morning, following an idle time interval, a branch is made from step 200 to the query step 201 and a query is made as to whether the predetermined counter reading n≧2 has been reached or exceeded in order to branch to a step 209. In said step 209, at least one count reading of the real-time counter is queried at time $t_n$ and a specific current/time product $C_{tn}$ for the quiescent time interval is formed according to Equation (7). A branch is then made to the step 210 and the sum of all current/time products $\Sigma\ C_{tn}$ is determined in order to subsequently again interpret the question to be raised according to Equation (11).

In the indirect capacity measurement of a battery, the current/time product $C_{t1}$ is thus formed for the quiescent time and/or for the transport time and is interpreted in view of the diminution of the battery capacity for an warning to be output.

The measurement of a parameter that has an unbeneficial influence on the consumption or the service life of another component part can likewise be replaced by the measurement of at least two parameters that stand for it and whose changes allow the current condition of the component part to be calculated. A count reading is again modified such that this approaches an outage threshold that is specific for the component part and such that the device outputs a warning before the end of use or, respectively, end of the service life of the component part is reached. The invention can be advantageously utilized for the indirect measurement of parameters of component parts that are located in a security module or in its immediate proximity.

A security module is preferably intended for use in postal devices, particularly for use in a postage meter machine. However, the security module can also comprise some other structure that makes it possible that, for example, it can be plugged onto the motherboard of a personal computer that, as PC franker, drives a commercially obtainable printer.

The invention is not limited to the present embodiment since it is obvious that further, other arrangements or, respectively, embodiments of the invention can be developed or, respectively, utilized that, proceeding from the same basic idea of the invention, are also covered by the attached claims for protection.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for determining a requirement to replace a component in a device, comprising the steps of:
   for a first parameter associated with said component which, if measured, would have an unbeneficial influence on at least one of consumption and service life of said component, selecting a second parameter as a representative of said first parameter; and
   measuring said second parameter, and not said first parameter at least at two times offset from each other, and from said change of said second parameter between said measurements of said second parameter, determining whether said component is in need of replacement.

2. A method as claimed in claim 1 comprising the additional steps of:
   generating a count;
   comparing said count to a threshold and, when said count reaches said threshold, generating a warning indicating a need to replace said component; and
   modifying said count dependent on said measurement of said second parameter.

3. A method as claimed in claim 1 wherein said component is a battery and wherein said second parameter is ambient temperature relative to a self-discharge current of said battery, and wherein said second parameter is measured in respective time intervals which respectively contribute in differing degrees to a reduction of a capacity of said battery, and wherein said time intervals are identified in an uninterrupted real-time measurement by a microprocessor which distinguishes between a transport time interval, an operating time interval and a quiescent time interval.

4. A method as claimed in claim 3 wherein said operating time interval and said quiescent time interval alternate.

5. A method as claimed in claim 3 comprising measuring said ambient temperature relative to said self-discharge current of said battery in said operating interval after said transport time interval and in an operating interval after said quiescent time interval, by forming, in said operating time interval, a current/time product employing an empirically determined current which flows in at least one of said transport time interval and said quiescent time interval and which diminishes said battery capacity.

6. A method as claimed in claim 5 wherein said current/time product is calculated in said operating time interval for a temperature-dependent battery discharge current that flows during said operating time interval, and wherein said current/time product is calculated in said quiescent time interval for a temperature-dependent battery discharge current and a load current.

7. A method as claimed in claim 5 comprising evaluating said measurement of said ambient temperature relative to said self-discharge current of said battery, and said time intervals, by determining a difference between a current/time product $C_{t1}$ for said transport time interval and a remaining capacity $x \cdot C_{t0}$ representing a predetermined portion x of an original battery capacity $C_{t0}$, and emitting said warning when said difference is no longer smaller than a sum of all current/time products determined during said operating time intervals and said quiescent time intervals.

8. An apparatus comprising:
   a component in need of replacement prior to at least one of consumption of component and an end of a service life of said component, said component having a first parameter associated therewith which, if measured, would have an unbeneficial influence on at least one of said consumption and service life of said component; and
   a measuring and evaluation arrangement that measures a second parameter, representing said first parameter, at least at two different times offset from each other and which determines whether said component is in need of replacement from a change in said second parameter between said at least two times.

9. An apparatus as claimed in claim 8 wherein said component has a time-dependent attribute related to said need to replace said component, and wherein said second parameter that is measured is time, and wherein said measurement and evaluation arrangement includes a memory wherein said time-dependent attribute is stored as a function of time, and wherein said measurement and evaluation unit determines said attribute from said stored relation and from said measurement of times at said at least two times, and wherein said measurement and evaluation arrangement determines whether said component is in need of replacement from said time-dependent attribute.

10. An apparatus as claimed in claim 9 further comprising a real-time clock for emitting a time parameter as said second parameter.

11. An apparatus as claimed in claim 8 wherein said component is a battery.

12. An apparatus as claimed in claim 8 wherein said measurement and evaluation unit includes a counter which emits a count which is compared to a threshold indicating an immediate need for replacement of said component, and wherein said measurement and evaluation arrangement modifies said count, dependent on said change in said second parameter, and generating a warning indicating a need for replacement of said component which said count reaches said threshold.

* * * * *